United States Patent
Choi et al.

(10) Patent No.: US 9,086,128 B2
(45) Date of Patent: Jul. 21, 2015

(54) STRUCTURE OF LEVER OF VEHICLE TRANSMISSION

(71) Applicants: Hyundai Motor Company, Seoul (KR); Kia Motors Corporation, Seoul (KR)

(72) Inventors: Jee-Hyuck Choi, Gyeonggi-do (KR); Bum-Jun Kim, Gyeonggi-do (KR); Hee-Soo Yang, Busan (KR); Yang-Rae Cho, Suwon (KR); Jeong-Seon Min, Gwangju (KR); Eun-Sik Kim, Gyeonggi-do (KR); Sug-Jun Youn, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 13/898,786

(22) Filed: May 21, 2013

(65) Prior Publication Data

US 2014/0216195 A1   Aug. 7, 2014

(30) Foreign Application Priority Data

Feb. 1, 2013   (KR) .......................... 10-2013-0011712

(51) Int. Cl.
| | |
|---|---|
| *F16H 59/04* | (2006.01) |
| *B60K 20/00* | (2006.01) |
| *G05G 5/00* | (2006.01) |
| *G05G 9/00* | (2006.01) |
| *F16H 59/02* | (2006.01) |

(52) U.S. Cl.
CPC ....... *F16H 59/0204* (2013.01); *Y10T 74/20067* (2013.01)

(58) Field of Classification Search
USPC ................ 74/473.1, 473.18, 473.21, 473.24, 74/473.25, 473.29, 473.3, 473.35
See application file for complete search history.

(56) References Cited

U.S. PATENT DOCUMENTS

| | | | | |
|---|---|---|---|---|
| 5,452,623 | A * | 9/1995 | Knight ....................... | 74/473.29 |
| 5,689,996 | A * | 11/1997 | Ersoy .............................. | 74/335 |
| 5,913,935 | A * | 6/1999 | Anderson et al. .............. | 74/335 |
| 6,105,452 | A * | 8/2000 | Bravo ........................ | 74/473.18 |
| 6,172,786 | B1 * | 1/2001 | Fujita et al. ................ | 359/200.1 |
| 6,295,886 | B1 * | 10/2001 | Russell ....................... | 74/473.18 |
| 6,401,564 | B1 * | 6/2002 | Lee ............................. | 74/473.18 |
| 6,783,480 | B2 * | 8/2004 | Masuda et al. .................. | 477/94 |
| 6,857,335 | B2 * | 2/2005 | Kahara ....................... | 74/473.33 |
| 7,357,380 | B2 * | 4/2008 | Menzel et al. ................ | 267/179 |
| 8,024,990 | B2 * | 9/2011 | Hirano ........................ | 74/473.18 |
| 8,371,188 | B2 * | 2/2013 | Bortolon et al. ............ | 74/473.21 |
| 2012/0125136 | A1 * | 5/2012 | Werdin ........................ | 74/473.3 |

FOREIGN PATENT DOCUMENTS

| | | |
|---|---|---|
| KR | 10-2006-0088211 | 8/2006 |
| KR | 10-2008-0047170 | 5/2008 |

* cited by examiner

*Primary Examiner* — David M Fenstermacher
*Assistant Examiner* — Jake Cook
(74) *Attorney, Agent, or Firm* — Mintz Levin Cohn Ferris Glovsky and Popeo, P.C.; Peter F. Corless

(57) ABSTRACT

A structure of a shift lever that changes to a manual mode. The structure includes a shift lever that has a protrusion formed to a horizontal side and a base spaced from the shift lever to allow the protrusion to reach the base during horizontal movement of the shift lever. A G-return to which the protrusion is coupled is mounted on the base to be able to turn and a knob that is connected to one end of a knob lever pivotably mounted on the base with the other end of the knob lever facing the shift lever, slides with the horizontal movement of the shift lever. The conversion to a manual mode is sensed from the sliding of the knob and change to the manual mode is controlled by turning of the G-return.

3 Claims, 5 Drawing Sheets

STRUCTURE OF LEVER OF VEHICLE TRANSMISSION

CROSS-REFERENCE TO RELATED APPLICATION

The present application claims priority of Korean Patent Application Number 10-2013-0011712 filed Feb. 1, 2013, the entire contents of which application is incorporated herein for all purposes by this reference.

BACKGROUND (a) Technical Field

The present invention relates to a structure of a shift lever, and more particularly a structure of a shift lever which can suppress noise while improving operational feel by improving the movement of a G-return from the sliding type of the related art to a rotating type, in a shift lever that is changed to a manual mode allowing a driver to control the gears step by step when it is moved horizontally.

(b) Background Art

The shift lever at a side of the driver seat in a vehicle with an automatic transmission can slide to the positions of P (Park), R (Reverse), N (Neutral), and D (Drive) and can support a manual mode allowing a driver to control the gears, depending on the type of vehicle. The shift levers supporting a manual mode in common vehicles are connected with a transmission by a shift cable to control the operation of the transmission by pulling and releasing the shift cable (vertically, shown in FIG. 1A).

Further, as shown in FIG. 1A, in a manual mode where shifting is manually performed by driver intention, as a protrusion 2 mounted or formed on a shift lever 1 moves down a knob 5 disposed in a base 3, the horizontal movement of the shift lever 1 is transmitted, as an electric signal, to a TCU (Transmission Control Unit). In particular, the knob 6 and a G-return 4 are disposed to face each other in the base 3 horizontally spaced from the shift lever 1, wherein the knob 6 and the G-return 4 are disposed vertically slidable. The G-return is a lever configured to return to an original position after a pivot action, wherein the pivot action shifts the gear.

Further, when the protrusion 2 is moved in between the knob 5 and the G-return 4, the TCU is configured to sense conversion into the manual mode from the descent of the knob 5 and the G-return 4 wherein the end of the protrusion therein slides with the operation of the shift lever 1, as the shift lever 1 moves vertically. The sliding of the G-return 4 is transmitted as an electric signal to the TCU, to allow shifting to be manually performed. In other words, the operation of the shift lever 1 is sensed by electric devices and sensors and sensing signals are transmitted as electric signals to the TCU in the manual mode.

SUMMARY

In the structure of the shift lever of the related art, as the protrusion 2 of the shift lever 1 is moved horizontally, the knob 5 is moved in a downward direction and is configured to sense the entry into the manual mode and the knob 5 and the G-return 4 are separated such that the G-return 4 can slide vertically. Thereafter, when a driver operates the shift lever 1 in the +/− direction (vertically), the G-return activates a contact type switch disposed in the base while sliding in the base 3, thereby generating an electric signal.

However, a friction force is generated at the contact portion between the G-return 4 and the base 3 and is transmitted to the driver, thereby causing unpleasant operational feel. Further, when the manual mode is changed to an automatic mode, the knob 5 hits against the G-return by an elastic force of a spring 6 due to the separation of the protrusion 2, thereby generating an impact sound.

Therefore, the present invention provides a structure of a shift lever which may improve operational feel, which is deteriorated by a friction force in operation of the shift lever, and may prevent an impact sound due to the hit between a knob and a G-return.

Specifically, the present invention provides a structure of a shift lever, which may have a protrusion and may change to a manual mode using the horizontal movement of the protrusion coupled to a G-return in a base. In addition, the structure of the shift lever may include a shift lever with a protrusion formed to a horizontal side; a base spaced from the shift lever to allow the protrusion to reach the base during horizontal movement of the shift lever; a G-return to which the protrusion is coupled wherein the G-return is mounted on the base to be able to turn; and a knob connected to one end of a knob lever pivotably mounted on the base wherein the other end of the knob lever facing the shift lever, and wherein the knob is configured to slide with horizontal movement of the shift lever, in which conversion to a manual mode is sensed from the sliding of the knob and change to the manual mode is controlled by the turning of the G-return.

A depression that the protrusion enters during horizontal movement of the shift lever may be formed at the G-return and an elastic cover member may be mounted on the G-return to prevent noise due to entering of the protrusion. The cover member may be made of TPU (Temperature polyurethane). The knob may be supported by elastic force of a spring and the knob lever may be configured to slide the knob against the elastic force of the spring during horizontal movement of the shift lever. Further, a damper may be mounted to suppress a shock generated between the knob lever and the base, when the knob lever is returned by the elastic force of the spring, due to the spacing between the shift lever and the knob lever.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a structure of a shift lever according to an exemplary embodiment of the present invention is described in detail with reference to the accompanying drawings.

Figure 2:
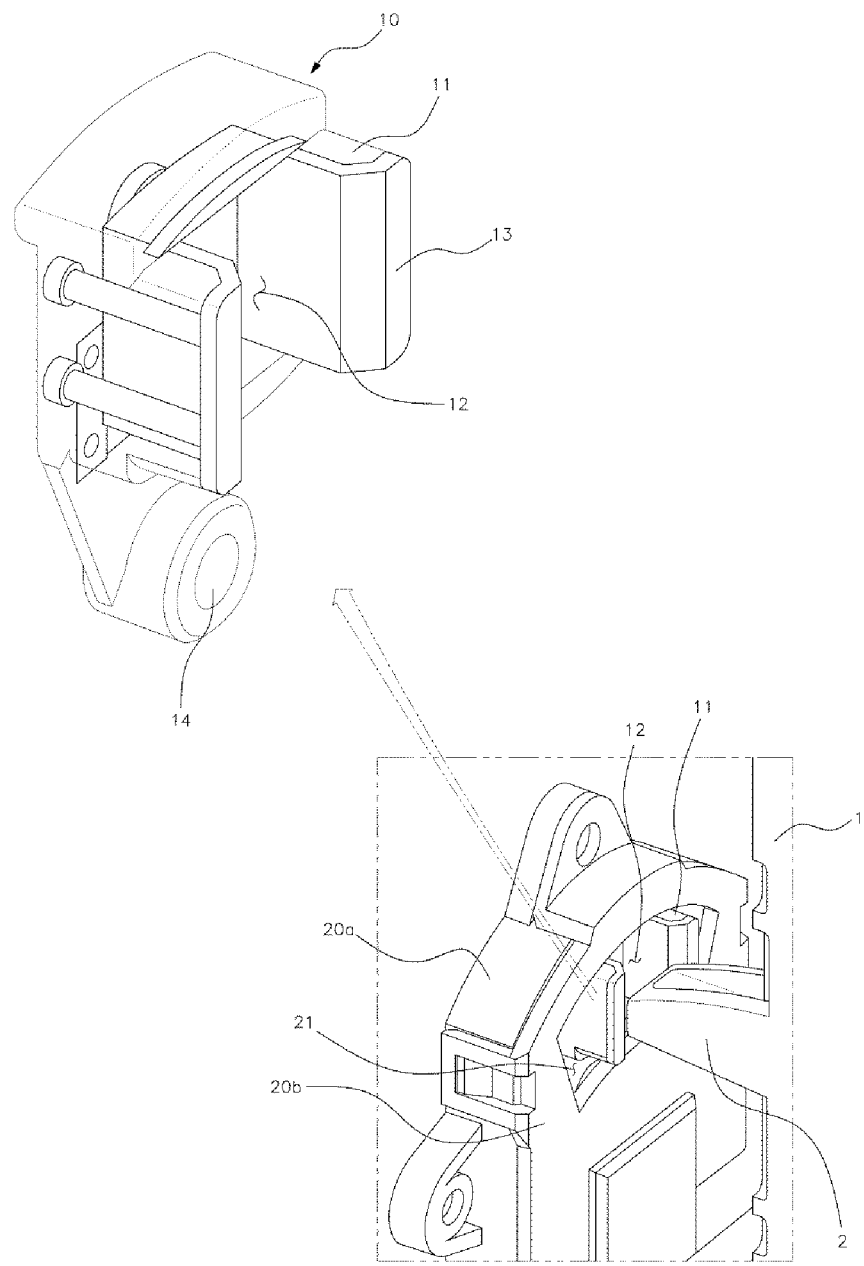
FIG. 2 is an exemplary view showing a G-return disposed in a base and the G-return separated from the base according to an exemplary embodiment of the present invention.

A shift lever 1 of the present invention, similar to the structures of the related art, may be moved vertically to the positions of P/R/N/D and may move horizontally (from the position of D) to change to a manual mode (e.g., for manual shifting with vertical movement of the shift lever). As shown in FIG. 2, a protrusion with a predetermined horizontal length may be formed toward a base 20 (20a, 20b) formed by combining two cases 20a and 20b. The base 20 may be positioned at a distance from the shift lever 1 (e.g., to an edge of the protrusion 2), when the shift lever 1 is horizontally moved. The base 20 may be fixed to a vehicle body, with a G-return 10 disposed at a top portion and a knob 32 disposed at a bottom portion and wherein the G-return 10 may have an opening 21 to allow the protrusion 2 to enter the G-return 10.

Figure 1A:
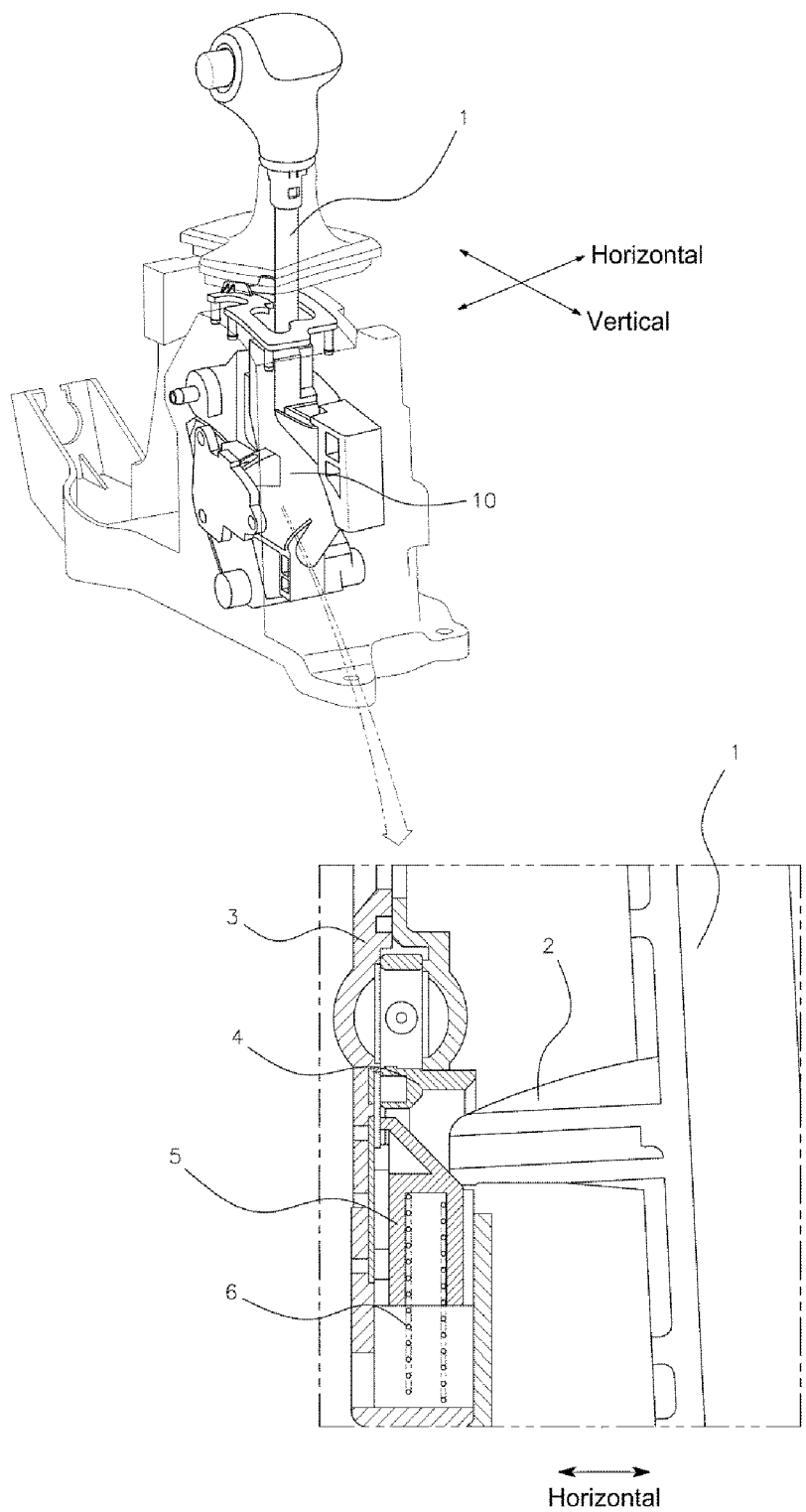
FIG. 1A is an exemplary view showing a mounted shift lever and an exemplary cross-sectional view when the shift lever horizontally moves to change to a manual shift mode according to the related art.
Figure 1B:
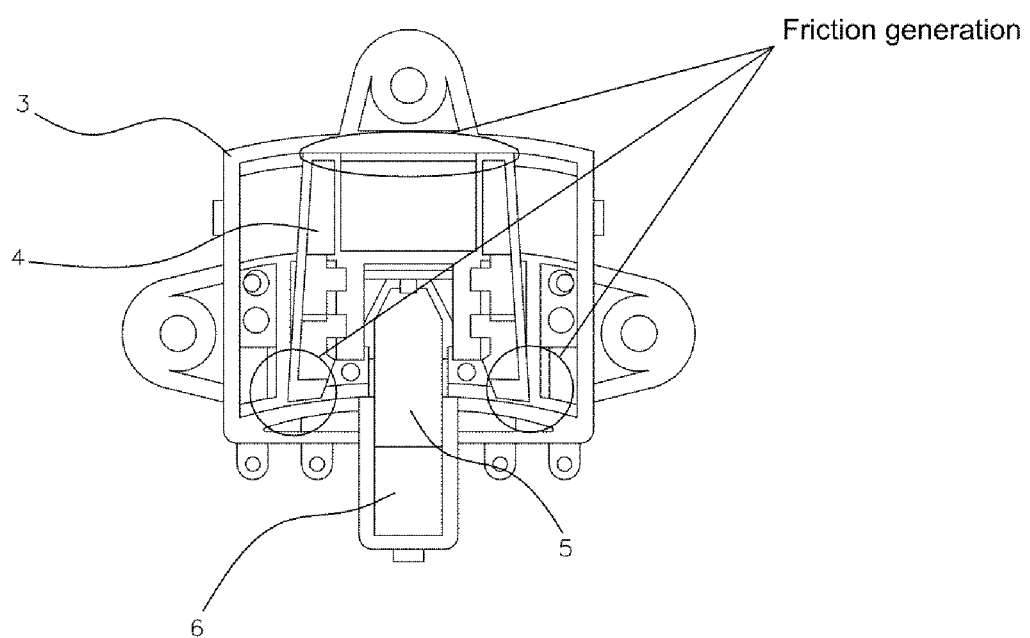
FIG. 1B is an exemplary view showing a knob and a G-return disposed in a base according to the related art.
Figure 3:
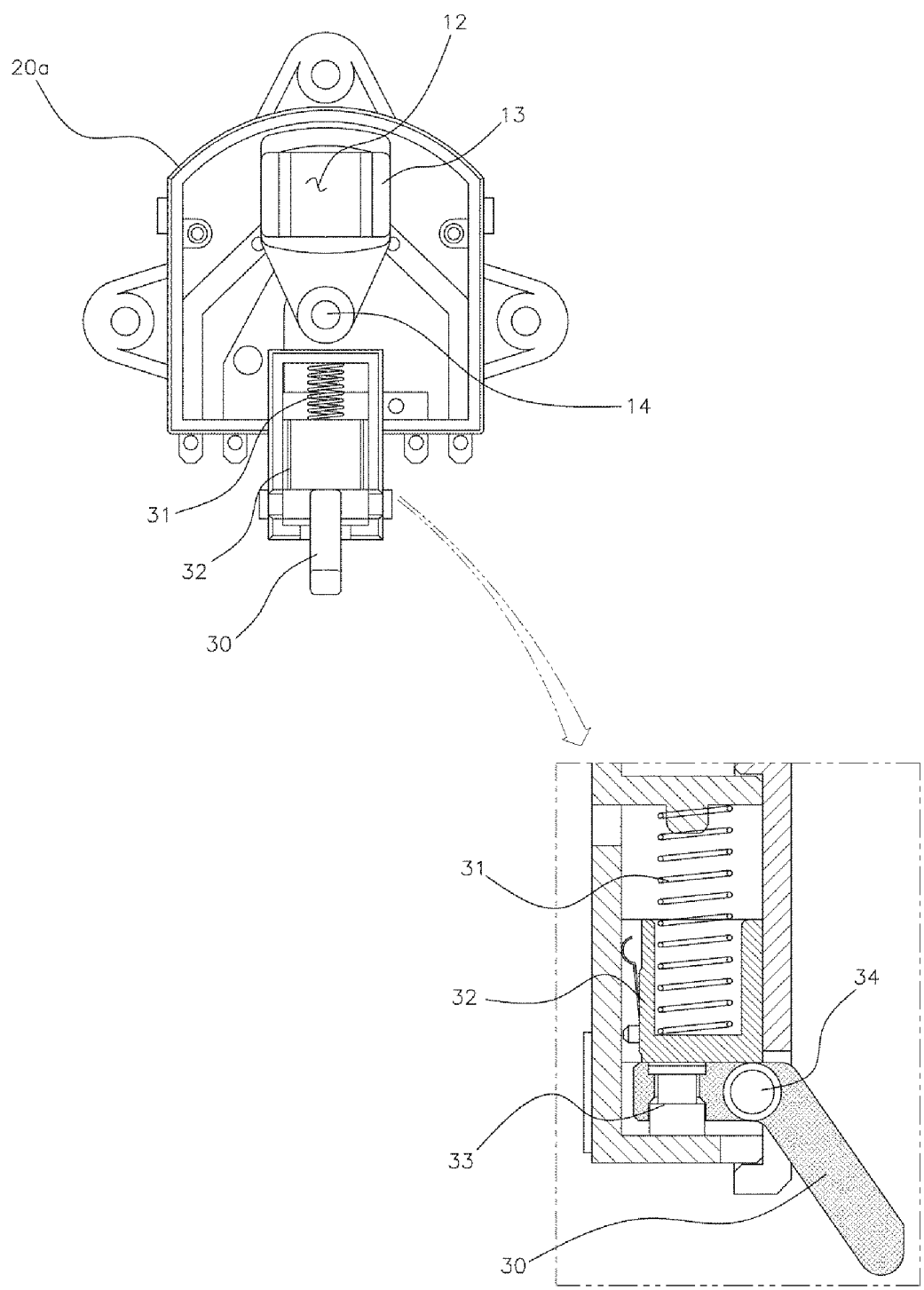
FIG. 3 is an exemplary view showing the status of the G-return and the knob before a protrusion is fitted thereto according to an exemplary embodiment of the present invention.
Figure 4:
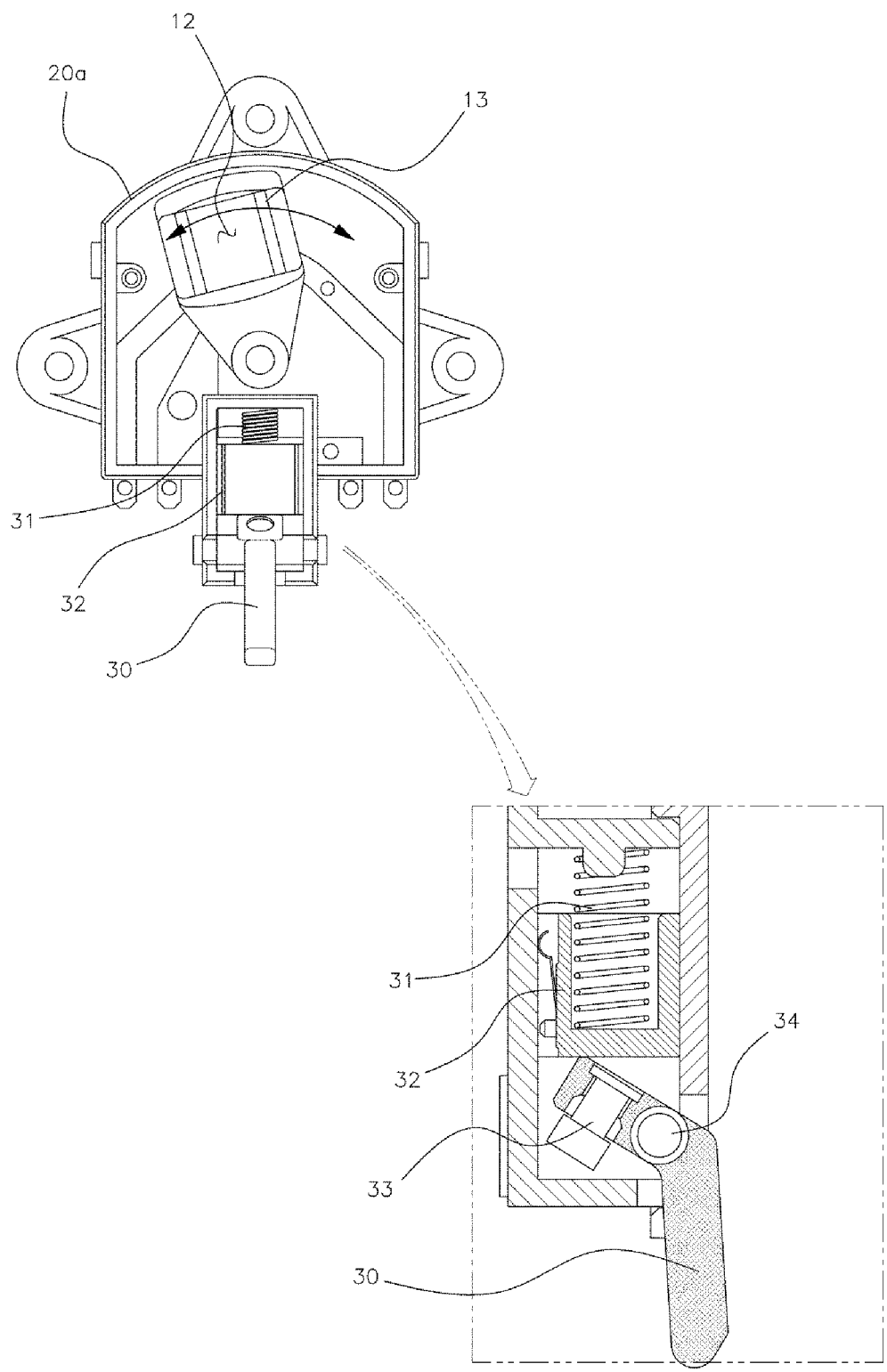
FIG. 4 is an exemplary view showing the status of the G-return and the knob after the protrusion is fitted thereto according to an exemplary embodiment of the present invention.

As shown in FIGS. 2 to 4, the G-return 10 may have a depression between two walls 11 facing the protrusion 2 to allow the protrusion to enter therein and the G-return 10 may be coupled to the base 20 by a hinge 14 to be able to turn (e.g., move vertically, shown in FIG. 1A) with sliding of the shift lever 1, with the protrusion 2 entering therein. Further, a sensor (not shown) or a switch configured to sense the turning of the G-return 10 may be disposed at both sides of the G-return 10 in the base 20.

The knob 32 may be mounted on the base 20 to be vertically movable at a predetermined distance under the G-return 10. The knob 32 may be coupled to one end of the knob lever 30 pivotably mounted on the base 10 by a hinge 34. In other words, the other end of the knob lever 30 may be disposed facing the shift lever 1 to allow the opposite end to move up the knob 32 with horizontal movement of the shift lever 1. Accordingly, the knob 32 may be lifted before the protrusion 2 enters the G-return, and may be returned by the gravity or an elastic force of a spring, when the protrusion 2 is separated from the G-return. A switch or a sensor (not shown) may be disposed in the base 20 to sense conversion to the manual mode by detecting the position of the knob 20.

Therefore, according to the structure of a shift lever of the present invention, which has the configuration described above, conversion to the manual mode may be sensed from sliding of the knob 32 and the manual mode may be implemented by turning of the G-return 10. Further, as described above, the depression 12 that the protrusion 2 may enter when the shift lever 1 horizontally moves may be formed at the G-return 10, and an elastic cover member 13 may be mounted on the G-return 10 to prevent noise due to entering of the protrusion 2. The cover member 13 may be made of TPU (Temperature polyurethane). The knob 32 may be supported by the elastic force of the spring 31 to maintain a standby status of the knob lever 30 (e.g., when the knob lever 30 has turned with the end facing the shift lever, as shown in FIG. 3) and the shift lever 1 may be spaced from the knob lever 30, to allow a damper 33 to be mounted on the knob lever 30 (or the base) to suppress a shock generated between the knob lever 30 and the base 20, when the knob lever 30 is returned (to the standby status) by the elastic force of the spring 31.

According to the present invention described above, the knob 32 may be individually lifted, before the protrusion 2 of the shift lever 1 is inserted into the depression 12 of the G-return 10, as the shift lever 1 is horizontally moved, and the G-return 10 may turn around the hinge 14, to prevent contact between the knob 32 and the G-return 10 and to reduce friction force by the turning of the G-return 10 (e.g., for changing gears to +/− by operating a contact type sensor instead of sliding of the related art).

According to the present invention having the configuration described above, since the G-return and the knob may be separately disposed in the base, it may be possible to suppress a shock between the knob and the G-return, and to suppress friction since the G-return turns, instead of slides, as in the related art. In addition, it may be possible to suppress noise due to the entering of the protrusion by mounting the cover member on the G-return, and to prevent an impact sound due to returning of the shift lever, using the damper mounted on the knob lever.

The specification and the embodiments shown in the drawings provide examples for helping understanding of the present invention, without limiting the scope of the present invention. It is apparent to those skilled in the art that the present invention may be modified in various ways on the basis of the spirit of the present invention other than the embodiments described herein.

What is claimed is:

1. A structure of a shift lever that changes to a manual mode, the structure comprising:
    a protrusion formed to a horizontal side of the shift lever;
    a base spaced from the shift lever to allow the protrusion to reach the base during horizontal movement of the shift lever;
    a G-return to which the protrusion is coupled, wherein the G-return is mounted on the base to be able to turn;
    a knob connected to one end of a knob lever pivotably mounted on the base with the other end of the knob lever facing the shift lever, wherein the knob is configured to slide with the horizontal movement of the shift lever, wherein conversion to the manual mode is sensed from the sliding of the knob and change to the manual mode is controlled by turning of the G-return;

a depression that the protrusion enters during the horizontal movement of the shift lever is formed at the G-return;
an elastic cover member made of temperature polyurethane and mounted on the G-return to prevent noise due to the entering of the protrusion; and
a damper mounted to suppress a shock generated between the knob lever and the base, when the knob lever is returned by the elastic force of a spring, due to the spacing between the shift lever and the knob lever.

2. The structure of claim 1, wherein the knob is supported by elastic force of the spring and the knob lever slides the knob against the elastic force of the spring during the horizontal movement of the shift lever.

3. A structure of a shift lever that changes to a manual mode, the structure comprising:
   a protrusion formed to a horizontal of the shift lever;
   a base spaced from the shift lever to allow the protrusion to reach the base during horizontal movement of the shift lever;
   a G-return to which the protrusion is coupled, wherein the G-return is mounted on the base to be able to turn;
   a knob connected to one end of a knob lever pivotably mounted on the base with the other end of the knob lever facing the shift lever, wherein the knob is configured to slide with the horizontal movement of the shift lever, to allow a conversion to the manual mode to be sensed from the sliding of the knob;
   a depression that the protrusion enters during the horizontal movement of the shift lever is formed at the G-return;
   an elastic cover member made of temperature polyurethane and mounted on the G-return to prevent noise due to the entering of the protrusion; and
   a damper mounted to suppress a shock generated between the knob lever and the base, when the knob lever is returned by the elastic force of a spring, due to the spacing between the shift lever and the knob lever.

* * * * *